United States Patent [19]
Kim et al.

[11] Patent Number: 5,714,570
[45] Date of Patent: Feb. 3, 1998

[54] METHOD FOR THE PREPARATION OF POLYESTER BY USE OF COMPOSITE CATALYST

[75] Inventors: Chung Yup Kim; Hyun Nam Cho; Hoi Wan Yoo, all of Seoul; Hyung Joon Kim, Kyungki-Do, all of Rep. of Korea

[73] Assignee: Korea Institute of Science and Technology, Seoul, Rep. of Korea

[21] Appl. No.: 683,123

[22] Filed: Jul. 16, 1996

Related U.S. Application Data

[63] Continuation of Ser. No. 164,456, Dec. 9, 1993, abandoned.
[51] Int. Cl.$^6$ .................. C08G 63/78; C08F 4/60
[52] U.S. Cl. .......... 528/279; 528/279; 528/281; 528/283; 528/285; 528/286; 528/287; 528/295.3; 528/296; 528/308; 528/308.6; 525/437; 524/81; 524/706; 524/710; 524/713; 524/779; 502/102; 502/103
[58] Field of Search .................. 528/279, 281, 528/283, 285, 286, 287, 308, 296, 308.6, 302, 295.3; 525/437; 524/81, 706, 710, 713, 779; 502/102, 103

[56] References Cited

U.S. PATENT DOCUMENTS 5,286,836  2/1994  Park et al. ................... 528/275

OTHER PUBLICATIONS

Grant et al. "Chemical Dictionary", 5th. Ed., pp. 219,587.

Morrison et al. "Organic Chemistry", 5th Ed., p. 699.

*Primary Examiner*—Samuel A. Acquah
*Attorney, Agent, or Firm*—Birch, Stewart, Kolasch & Birch, LLP

[57] ABSTRACT

A method for preparing polyester by use of a catalyst. The method comprises the steps of: esterifying either a terephthalic acid, a dicarboxylic acid containing terephthalic acid or derivatives thereof with either ethylene glycol or a glycol containing ethylene glycol, or derivatives thereof to produce an esterification product containing either bis(β-hydroxyethyl) terephthalate, its low molecular weight polymer, or a combination of β-hydroxyethyl terephthalate and its low molecular weight polymer; and continuously polycondensing the obtained esterification product to prepare a polyester, wherein in the said polycondensing step, a composite polymerization catalyst dissolved in an ethylene glycol or an ethylene glycol-containing solution, consisting of a compound of antimony, a compound of titanium, and a compound of tin is used. The method can considerably reduce both the esterification time and the polycondensation time and provides a good color, reduced content of diethylene glycol and reduced concentration of terminal carboxyl groups in the prepared polyesters.

29 Claims, No Drawings

METHOD FOR THE PREPARATION OF POLYESTER BY USE OF COMPOSITE CATALYST

This application is a continuation of application Ser. No. 08/164,456 filed on Dec. 9, 1993, now abandoned.

BACKGROUND OF THE INVENTION

1. Field of the invention

The present invention relates, in general, to a method for preparing polyester and, more particularly, to novel, composite catalysts which are especially useful in the preparation of polyesters.

2. Description of Related Art

Polymeric polyesters are prepared from dihydric alcohols or their functional derivatives and dicarboxylic acids or their functional derivatives. At the present time, highly polymerized polyesters are widely used for manufacturing bottles, fibers, films, and other industrial materials. Of the polymeric polyesters, polyethylene terephthalates are most widely known and most commercially important because of their high degree of crystallization, high softening point, and other various superior properties in terms of strength, chemical resistance, thermal resistance, weather resistance, electric insulation, etc.

Such polyethylene terephthalates are industrially prepared by means of either a direct esterification or an ester-interchange reaction. In the direct esterification, a terephthalic acid and an ethylene glycol are heated to reaction temperatures ranging from 200° to 280° C. under atmosphere or pressure to directly esterify them. On the other hand, the ester-interchange method comprises two steps: in the first step, a methyl terephthalate and an ethylene glycol are reacted in the presence of catalysts at reaction temperatures ranging from 160° to 240° C. to synthesize prepolymers, that is, bis(beta-hydroxyethyl) terephthalate and/or its low polymer (hereinafter "esterified compounds"); and thereafter, in the second step, the synthesized, esterified compounds are polycondensed in the presence of polymerization catalysts at still higher reaction temperatures ranging from 260° to 300° C. under reduced pressure, in order to prepare high polymers. Recently the above-mentioned direct esterification method has been mainly adopted to industrially prepare polyesters, since it is much more advantageous than the ester-interchange method from an economical point of view.

Generally, reaction catalysts are used to accelerate and smoothly advance a reaction in preparing polyesters. These catalysts include a variety of metal compounds such as antimony, titanium, germanium, tin, zinc, manganese, lead and the like. It is well known to those skilled in the art that the color and thermal stability of the resulting polyester product and the reaction rate are considerably varied depending upon the kinds of catalyst used. The reactions for preparing polyesters are carried out at high temperatures for long times in the presence of catalysts containing metals. Accordingly, the reactions for preparing polyesters of a high degree of polymerization in a short time are accompanied by several undesirable side reactions that result in coloring the polyester product yellow and increasing the content of diethylene glycol and the concentration of terminal carboxyl groups above their optimum levels. Consequently, the physical properties of the prepared polyesters, for example, melting point, strength and the like are deteriorated. Therefore, it is important to prepare polyesters that can exhibit good color and superior physical properties even at a high reaction rate. At the present time, an antimony compound, especially antimony trioxide, is mainly used as an industrial polycondensation catalyst, since it is inexpensive and exhibits good catalyst activity and good thermal stability. However, antimony trioxide is hardly soluble in ethylene glycol or other reaction mixtures and tends to be precipitated during the reaction, thereby causing the resulting polyester to be colored gray or yellow-green or the transparency thereof to be decreased. These are more remarkable if the amount of the catalyst used and the reaction temperature are increased to improve productivity.

In order to provide catalysts for solving the aforementioned problems, there have been several methods proposed to reduce the esterification reaction time and the polycondensation reaction time and to produce polyesters exhibiting good color and superior physical properties. However, none of them can hardly solve the above-mentioned problems. As a method for reducing the reaction time, there have been known, for example, a method that involves reacting a compound of silicone with a compound of titanium (U.S. Pat. No. 3,972,052), a method that involves dissolving antimony trioxide, a compound of cobalt and a compound of phosphorous in ethylene glycol (Japanese Laid-Open Patent Publication No. Sho 53-51295) and a method in which a compound of antimony is used with an organic acid (Japanese Laid-Open Patent Publication No. Sho 60-166320). However, these methods cannot substantially reduce both the esterification reaction time and the polycondensation reaction time. They also generate several problems in physical properties of the prepared polyester, in that the prepared polymer is colored light yellow or the contents of diethylene glycol or terminal carboxyl groups are increased. On the other hand, as a method for improving the color and physical properties of the prepared polymer, there have been known, for example, a method in which compounds of cobalt and alkali metal are used with a compound of antimony (Japanese Laid-Open Patent Publication No. Sho 58-11216), a method in which a compound of antimony is used with a compound of tin (Japanese Patent Publication No. Sho 49-31317), and a method in which antimony, tin, cobalt and alkali are used with a compound or phosphorous (Japanese Laid-Open Patent Publication No. Sho 62-256324). However, these methods can not improve the color, transparency and physical properties of the prepared polymer at the same time and provide any important advantage in terms of the reduction of the reaction time. As is apparent from the above description, it is important to reduce both the esterification time and the polycondensation time and provide good color and superior physical properties of the resulting polymer, in order to obtain high quality polyesters with high productivity.

SUMMARY OF THE INVENTION

Therefore, an object of the present invention is to solve the aforementioned problems encountered in the prior art and to provide a method for preparing polyesters of a high quality, capable of considerably reducing both the esterification time and the polycondensation time and providing good color, reduced content of diethylene glycol and reduced condensation of terminal carboxyl groups in the resulting polyesters.

In accordance with the present invention, the above object can be accomplished by providing a method for preparing polyesters, comprising the steps of: esterifying either a terephthalic acid, a dicarboxylic acid containing terephthalic acid or derivatives thereof with either ethylene glycol or a glycol containing ethylene glycol, or derivatives thereof to produce an esterification product containing either bis(β-hydroxyethyl) terephthalate, its low molecular weight polymer, or a combination of β-hydroxyethyl terephthalate and its low molecular weight polymer; and continuously polycondensing the obtained esterification product to prepare a polyester, wherein in the said polycondensing step, a composite polymerization catalyst dissolved in an ethylene glycol or an ethylene glycol-containing solution, consisting of a compound of antimony, a compound of titanium represented by the following general formula (I)

$$(R_1O)_4Ti.HP(O)(OR_2)_2 \qquad I$$

wherein:

$R_1$ and $R_2$ are independently aliphatic or substituted alkyl groups or aromatic aryl groups and may be the same or different from each other, and a compound of tin represented by the following formula (II)

$$(R_3)_2SnX \qquad II$$

wherein:

$R_3$ is an aliphatic group or substituted alkyl group or an aromatic aryl group and may be the same or different from the said $R_1$ and the said $R_2$; and X is selected from the group consisting of oxygen, sulfur, halogen, and a compound containing an ether, a thio or an ester bond, is used.

Excellent effects are obtained when the composite polymerization catalyst is used in the temperature range of approximately from 20° to 200° C. and, more preferably, 30° to 150° C.

Preferred $R_1$, $R_2$ and $R_3$ used in the present invention may independently include methyl, ethyl, n-propyl, isopropyl, n-butyl, isobutyl, sec-butyl, tert-butyl, n-amyl, acetylisopropyl, pentyl, hexyl, heptyl, 2-ethylhexyl, octyl, decyl, dodecyl, tridecyl, octadecyl, stearyl, allyl, 2,2-diallyloxymethylbutyl, cyclopentyl, cyclohexyl, naphthyl, phenyl, benzyl or dodecylbenzyl.

According to the present invention, a preferred compound of antimony used for the composite polymerization catalyst is selected from the group consisting of antimony trioxide and antimony triacetate.

DETAILED DESCRIPTION OF THE INVENTION

The method of the present invention can be advantageously used when polyester polymers are prepared by reacting terephthalic acid or a dicarboxylic acid containing terephthalic acid as an essential ingredient and derivatives thereof with ethylene glycol or a glycol containing ethylene glycol as an essential ingredient. The representative acid and derivatives thereof are terephthalic acid and dimethyl terephthalate. The representative glycol is ethylene glycol. Also, the method may be used for preparing polyester copolymers containing a third ingredient. However, it is preferred that the content of the third ingredient does not exceed 40 molar %. The third ingredient may be for example, an aromatic, aliphatic or an alicyclic dicarboxylic acid, such as phthalic acid, isophthalic acid, naphthalenedicarboxylic acid, diphenylether dicarboxylic acid, diphenoxyethane dicarboxylic acid, malonic acid, succinic acid, glutaric acid, adipic acid, azelaic acid, sebacic acid, cyclohexane dicarboxylic acid, decalindicarboxylic acid, and ester derivatives thereof, such as methyl ester, ethyl ester and compounds of phenylester. Also, examples of the glycolic ingredient that can be used as the third ingredient are aliphatic, aromatic and alicyclic diols such as 1,3-propane diol, 1,2-propane diol, 1,4-butane diol; 1,3-butane diol, 1,5-pentane diol, 1,6-hexane diol, 1,4-cyclohexane dimethanol, bisphenol A, bisphenol S, bishydroxyethoxy bisphenol A and tetrabromo bisphenol A.

The catalysts of the present invention are especially useful for the preparation of polyesters by the polycondensation of the esterification product containing bis(β-hydroxyethyl) terephthalate. These polyesters are useful for the production of shaped articles, such as fibers, films, injection molded articles, laminates and the like.

In accordance with the present invention, the catalysts comprise of a compound of antimony, a compound of titanium represented by the following general formula (I)

$$(R_1O)_4Ti.HP(O)(OR_2)_2 \qquad I$$

wherein:

$R_1$ and $R_2$ are independently aliphatic or substituted alkyl groups of 1 to about 20 carbon atoms or aromatic aryl groups of 1 to about 20 carbon atoms and may be the same or different from each other, and a compound of tin represented by the following formula (II)

$$(R_3)_2SnX \qquad II$$

wherein:

$R_3$ is an aliphatic or substituted alkyl group of 1 to about 20 carbon atoms or an aromatic aryl groups of 1 to about 20 carbon atoms and may be the same or different from the said $R_1$ and the said R2; and X is selected from the group consisting of oxygen, sulfur, halogen, and a compound containing an ether, a thio or an ester bond.

The compound of antimony used as the catalyst for preparing polyesters includes antimony oxides, such as antimony trioxide, antimony tetraoxide or antimony pentoxide, antimony halides, such as antimony trichloride or antimony trifluoride, antimony carboxylates, such as antimony triacetate, antimony tristearate, antimony tribenzonate, antimony tri-2-ethylhexanoate or antimony trioctoate, a compound of antimony combined with ether, such as antimony trimethoxide, antimony ethylene glycoxide, antimony triisopropoxide, antimony tri-n-butoxide and antimony triphenoxide, antimony hydroxide, and antimony sulfides. Of these compounds, antimony trioxide and antimony triacetate are particularly preferred.

As an ingredient of the present catalyst, the compound of titanium is a compound having the general formula (I)

$$(R_1O)_4Ti.HP(O)(OR_2)_2 \qquad I$$

wherein:

$R_1$ and $R_2$ are independently aliphatic or substituted alkyl groups of 1 to about 20 carbon atoms or aromatic aryl groups of 1 to about 20 carbon atoms and may be the same or different from each other.

Preferred $R_1$ and $R_2$ of the compound of titanium according to present invention may independently include methyl, ethyl, n-propyl, isopropyl, n-butyl, isobutyl, sec-butyl, tert-butyl, n-amyl, acetylisopropyl, pentyl, hexyl, heptyl, 2-ethylhexyl, octyl, decyl, dodecyl, tridecyl, octadecyl, stearyl, allyl, 2,2-diallyloxymethylbutyl, cyclopentyl, cyclohexyl, naphthyl, phenyl, benzyl or dodecylbenzyl.

In addition, another compound of titanium may be used that includes a compound of titanium ester, such as titanium ethyleneglycoxide or titanium tetrachloride, a compound of titanium ester, such as potassium titanium oxyoxalate, a compound of monoalkoxy titanate, such as isopropyl triisostearoyl titanate and isopropyl tri(N-ethylene diamino) ethyl titanate, a compound of chelate titanate, such as di(cumylphenyl) oxoethylene titanate and di(dioctyl) phosphato ethylene titanate, a compound of neoalkoxytitanate, such as neopentyl(diallyl)oxytri(N-ethylenediamino)ethyltitanate and neopentyl(diallyl)oxytri(dodecyl)benzenesulfonyltitanate, and a compound of heterocyclic titanate, such as cyclo(dioctyl) pyrophosphatodioctyltitanate and dicyclo(dioctyl) pyrophosphatotitanate.

Another ingredient that can be used for the catalysts of the present invention is a compound of tin having the general formula (II)

$$(R_3)_2 SnX \qquad \text{II}$$

wherein:

R$_3$ is an aliphatic or substituted alkyl group of 1 to about 20 carbon atoms or an aromatic aryl group of 1 to about 20 carbon atoms and may be the same or different from the said R$_1$ and the said R$_2$; and X is selected from the group consisting of oxygen, sulfur, halogen, and a compound containing an ether, a thio or an ester bond.

For example, the compound of tin includes dibutyltin oxide, diphenyltin sulfide, dimethyltin dichloride, dibutyltin sulfate, dioctyltin mercaptide, dibutyltin bis(butylmalate), dioctyltin diacetate, dibutyltin bis(dibutyldithiocarbamate), dibutyltin laurate, dibutyltin disalicylate, dibutyltin malate, dioctyltin bis(isooctylmercaptoacetate), dibutyltindimethoxide, dibutyltinlauratemalate, dibutyltinstearate, dioctyltindimalate, and dibutyltinmercaptoacetate.

Good results may be obtained by using one or more of the above-mentioned various compounds of antimony together with one or more of the various compounds of titanium and tin, respectively.

Not limited as it is, it is preferred that the amount of catalyst used in the present invention is determined to provide a sufficient reaction rate depending on the reaction condition. Normally, the proper total amount of the catalyst to the amount of the resulting polyester polymer is on the order of 250 to 1,000, and preferably 350 to 750.

The catalyst according to the present invention may be added during or after the esterification and before the polycondensation. It is, however, most advantageous to carry out the addition of catalyst before the esterification, to reduce the total reaction time, which improves the productivity. In carrying out the direct esterification, which uses a terephthalic acid and an ethylene glycol, it is preferable to add the catalyst into a slurry of the terephthalic acid and the ethylene glycol. Alternatively, a good result may be obtained by adding the catalyst before the esterification and before polycondensing individually.

The reaction temperature in direct esterification using the catalyst of the present invention is preferably on the order of from 200° to 280° C., and more preferably 220° to 260° C., which is well-known to those skilled in the technical field to which the present invention pertains. It is also possible to carry out the reaction under atmosphere or pressure. On the other hand, in the ester interchange reaction, the conventionally-used catalyst is substituted by one of the present invention and reaction temperatures ranging from 160° to 240° C. are used. The esterification products are polycondensed at reaction temperatures ranging from 260° to 300° C. and, particularly, at a final temperature ranging from 275° to 290° C.

In the polycondensation, the temperature is elevated slowly along with the vacuum degree. A final vacuum degree of not more than 1 torr is preferable.

Other catalysts can be used together with the present catalysts within the scope of the present invention. For example, these catalysts include a compound of germanium, such as germanium oxide, a carboxylate compound of zinc, manganese and lead, such as zinc acetate, manganese acetate and lead acetate, a compound of an alkali metal, such as sodium, potassium hydroxide and potassium acetate, and a compound of an alkali earth metal such as magnesium or calcium hydroxide and calcium acetate.

A polyfunctional cross-linking agent may be added in preparing polyesters according to the present invention. The polyfunctional cross-linking agent includes trimellitic acid, trimesic acid, pyromellitic acid, trimethylotpropane, glycerine and pentaerythritol.

Also, it is advantageous to add a monofunctional terminating agent, such as monomethoxypolyethylene glycol, stearyl alcohol, palmitic acid, benzoic acid and naphthoic acid.

Thermal stabilizers which are normally added in preparing polyester polymers include phosphorous compounds, such as phosphoric acid, phosphorous acid, metaphosphoric acid, trimethylphosphate, triethylphosphate, triphenylphosphite, dicyclohexylphosphite, diphenylphosphite, dioctylphosphite, dimethylpyrosphosphate, diethylpyrophophosphate, diphenylpyrophophosphate, dicyclohexylpyrophosphate and dioctylpyrophosphate.

As an antioxidant used in the present invention, Iganox series, which are hindered phenols, commercially manufactured by CIBA-Geigy Company in Germany, may be employed. For example, IRGANOX 1010, IRGANOX 1076 and IRGANOX 1098 can be used.

If desired, other additives may be used. For example, these additives include a complementary color agent, such as cobalt acetate, an ultraviolet absorbent, such as benzotriazole, an anti-softening point dropping agent, such as triethylamine, a delustering agent such as titanium oxide, a nuclear agent, such as silica and alumina, and other compounds, such as a dyestuff, a fluorescent whitening agent, an antistatic agent and a flame retardant.

The present invention will now be further described with reference to specific examples. It should be understood that these examples are intended to be illustrative only and the present invention is not limited to the conditions, materials or devices recited therein.

In the following examples, all parts are given by weight unless otherwise stated. Also, the intrinsic viscosity (η) of the polymers is calculated at 30° C. by using a solution of 6 parts of phenol admixed with 4 parts of tetrachloroethane. The content of diethylene glycol (DEG) is measured from the decomposition products of the polymers in hydrazine by gas chromatography. The color of the polymers is measured at the chip state polymers by color diffractometer, and the L values and b values describe lightness and the degree of yellow coloration of the polyesters, respectively. A higher L value and a lower b value indicate improved color.

EXAMPLE 1

After heating the composite catalyst solution, in which 280 ppm of antimony trioxide, 300 ppm of tetraisopropyl di(dioctyl)phosphito titanate and 20 ppm of dibutyltin salicylate to the amount of the resulting polyester products were dissolved in ethylene glycol at 60° C. for an hour, the heated catalyst solution was added to a slurry of ethylene glycol and terephthalic acid as a reaction catalyst. At this time, the entire amounts of ethylene glycol and terephthalic acid used were 152 parts and 370 parts, respectively, so that the molar ratio of them was controlled to be 1:1. And then, the ethylene/terephthalic acid slurry, being added with the reaction catalysts, was fed into an esterification reactor in which esterification products were already present. Subsequently, the slurry was subjected to direct esterification under atmosphere for 190 mins. at 240° C. to give esterification products.

Thereafter, the resulting esterification products were fed into a polycondensation reactor equipped with an agitator and a torquemeter. Polycondensation was carried out for 105 mins. under pressure that was slowly dropped to 0.8 torr and at temperature that was slowly increased to 285° C. The polycondensed products were extruded from the lower nozzle of the reactor into cooling water in order to form chip state polymers.

The characteristics of the resulting polymers are given as shown in Table 1.

COMPARATIVE EXAMPLE 1

A slurry of ethylene glycol and terephthalic acid was directly esterified in a manner similar to that in Example 1, except that catalysts were not used. The esterification was continued for 360 mins.

Then, the esterification products were added with 380 ppm of antimony trioxide and 120 ppm of trimethyl phosphate to the amount of the resulting polyester products being formed in the same conditions as those in Example 1. The esterification products were polycondensed for 172 mins. to prepare polymers.

COMPARATIVE EXAMPLE 2

A slurry of ethylene glycol and terephthalic acid was esterified in a manner similar to that in Example 1, except that 380 ppm of tetraisopropyl di(dioctyl)phosphito titanate was used as a catalyst. The esterification was continued for 220 mins.

Then, the esterification products were polycondensed in the same polymerizing conditions as those in Example 1.

The characteristics of the resulting polymers are described in Table 1.

EXAMPLE 2

The slurry of ethylene glycol and terephthalic acid of Example 1 was added with the composite catalyst solution of 250 ppm of antimony triacetate, 300 ppm of tetra(2,2-diallyloxymethyl)butyldi(ditridecyl)phosphito titanate and 50 ppm of dioctyltin diacetate dissolved in ethylene glycol as a reaction catalyst which had been already heated for 30 mins at 120 ° C. The resulting slurry was esterified for 195 mins. under the same conditions as in Example 1. Thereafter, the resulting esterification products were fed into the potycondensation reactor and were polycondensed for 112 mins. therein under the same conditions as in Example 1.

The characteristics of the resulting polymers are shown in Table 1.

EXAMPLE 3

After heating the composite catalyst solution, in which 250 ppm of antimony trioxide, 300 ppm of tetroctyldi (ditridecyl)phosphito titanate and 10 ppm of dibutyltin stearate were dissolved at 50° C. for two hours, the heated catalyst solution was added to the slurry of ethylene glycol and terephthalic acid of ethylene glycol and terephthalic acid of Example 1. The slurry together with the catalyst was esterified for 200 mins. under the same conditions as in Example 1. The resulting esterification products were fed into the polycondensation reactor and polycondensed therein for 125 mins. under the same conditions as in Example I to prepare polymers.

EXAMPLE 4

The esterification reaction and the polycondensation reaction were carried out in a manner similar to that in Example 1, except that a composite catalyst solution, in which 285 ppm of antimony trioxide, 300 ppm of tetraisopropyldi (dioctyl)phosphito titanate and 15 ppm of dibutyltin maleate are dissolved in ethylene glycol was used. The esterification products which had resulted from the esterification for 192 mins. was fed into the polycondensation reactor and then polycondensed for 110 mins. to give polymers.

EXAMPLE 5

The esterification reaction and the polycondensation reaction were carried out in a manner similar to that in Example 1, except that a composite catalyst solution, in which 200 ppm of antimony trioxide, 350 ppm of tetraisopropyldi (dioctyl)phosphito titanate and 100 ppm of dibutyltin salicylate are dissolved in ethylene glycol was used. The esterification products which had resulted from the esterification for 195 mins. was fed into the polycondensation reactor and then polycondensed for 108 mins. to give polymers.

EXAMPLE 6

The esterification reaction and the polycondensation reaction were carried out in a manner similar to that in Example 1, except that a composite catalyst solution, in which 300 ppm of antimony trioxide, 320 ppm of tetrabutyldi(dioctyl) phosphito titanate and 30 ppm of dibutyltinbis (butylmaleate) are dissolved in ethylene glycol was used. The esterification products which had resulted from the esterification for 185 mins. was fed into the polycondensation reactor and then polycondensed for 105 mins. to give polymers.

EXAMPLE 7

The esterification reaction and the polycondensation reaction were carried out in a manner similar to that in Example 1, except that a composite catalyst solution, in which 250 ppm of antimony triacetate, 350 ppm of tetraisopropyldi (dioctyl)phosphito titanate and 150 ppm of dibutyltinbis (isooctylmercaptoacetate) are dissolved in ethylene glycol was used. The esterification products which had resulted from the esterification for 187 mins. was fed into the polycondensation reactor and then polycondensed for 112 mins. to give polymers.

EXAMPLE 8

970 parts of dimethylterephthalate and 640 parts of ethylene glycol along with the reaction catalysts of the same concentrations as those in Example 1 were added to an ester interchange reactor and were esterified at the temperature rising to 220° C. for 125 mins. The esterification products were fed to the polycondensation reactor and polycondensed for 100 mins. therein under the same conditions as in Example 1 to give polymers.

COMPARATIVE EXAMPLE 3

The ester interchange reaction was carried out in a manner similar to that in Example 8, except that 0.33 parts of manganese acetate was added to the catalysts. After ester interchange for 205 mins., the resulting ester interchange products were added with 370 ppm of antimony trioxide and 100 ppm of triphenylphosphate based on the resulting polyester products, and polycondensed for 160 mins. under the same conditions as those in Example 1 to give polymers.

TABLE 1

| Examples | Intrinsic viscosity (η) dl/g | DEG content (weight %) | COOH conc. (equivalent/ ton) | L value | b value |
|---|---|---|---|---|---|
| Example 1 | 0.650 | 0.70 | 23.5 | 59.8 | 1.7 |
| C. Example 1 | 0.640 | 1.12 | 29.2 | 56.1 | 2.2 |
| C. Example 2 | 0.643 | 1.30 | 31.0 | 57.0 | 5.9 |
| Example 2 | 0.645 | 0.83 | 25.2 | 58.8 | 2.0 |
| Example 3 | 0.644 | 0.75 | 26.5 | 59.7 | 2.0 |
| Example 4 | 0.648 | 0.80 | 24.1 | 61.2 | 1.8 |
| Example 5 | 0.649 | 1.11 | 28.1 | 60.2 | 2.5 |
| Example 6 | 0.645 | 0.75 | 24.0 | 60.5 | 1.8 |
| Example 7 | 0.647 | 0.80 | 23.5 | 59.1 | 2.3 |
| Example 8 | 0.650 | 0.68 | 25.2 | 59.7 | 2.8 |
| C. Example 3 | 0.645 | 0.85 | 26.1 | 55.3 | 2.1 |

From the results of the Examples and the Comparative Examples, it is apparent that the polyester polymers are prepared by the method according to the present invention in considerably reduced both esterification time and polycondensation time, as compared with conventional methods. In addition, the polyester polymers prepared by means of the composite catalysts according to the present invention show good colors and superior physical properties and have low concentrations of terminal carboxylic groups.

Consequently, in accordance with the present invention, polyester polymers of high quality can be provided.

What is claimed is:

1. A method for preparing polyesters, comprising the steps of:

esterifying a dicarboxylic acid and a glycol, to produce an esterification product; and continuously polycondensing the obtained esterification product to prepare a polyester, wherein during or after said esterifying step, a composite polymerization catalyst dissolved in glycol is used, said composite polymerization catalyst consisting of:

at least one compound of antimony;

at least one compound of titanium selected from the group consisting of a compound represented by formula I $$(R_1O)_4Ti \cdot HP(O)(OR_2)_2 \qquad I$$

wherein $R_1$ and $R_2$ are the same or different, and are independently selected from the group consisting of an aliphatic group of 1 to 20 carbon atoms, an aromatic aryl group of 6 to 20 carbon atoms, a titanium ester, a monoalkoxy titanate, a titanate chelate, a neoalkoxytitanate, and a heterocyclic titanate; and at least one compound of tin selected from the group consisting of dibutyltin salicylate, dioctyltin diacetate, dibutyltin stearate, dibutyltin maleate, dibutyltin bis (butylmaleate) and dibutyltin bis (isooctylmercaptoacetate).

2. The method according to claim 1, wherein the amount of said composite polymerization catalyst is about 250 to 1,000 ppm on the basis of the amount of the resulting polyester.

3. The method for preparing polyesters according to claim 1, wherein a solution of said glycol, in which said composite polymerization catalyst is dissolved, is heated at a temperature ranging from approximately 20° C. to approximately 200° C. during the reaction.

4. The method according to claim 1, wherein said temperature ranges from approximately 30° to 150° C.

5. The method according to claim 1, wherein said aliphatic group is selected from the group consisting of a methyl group, an ethyl group, an n-propyl group, an isopropyl group, an n-butyl group, an isobutyl group, a sec-butyl group, a tert-butyl group, an n-amyl group, an acetylisopropyl group, a pentyl group, a hexyl group, a heptyl group, a 2-ethylhexyl group, an octyl group, a decyl group, a dodecyl group, a tridecyl group, an octadecyl group, a stearyl group, an allyl group, a 2,2-diatlyloxymethylbutyl group, a cyclopentyl group, and a cyclohexyl group; and said aromatic aryl group is selected from the group consisting of a naphthyl group, a phenyl group, a benzyl group, and a dodecylbenzyl group.

6. The method according to claim 1, wherein said compound of antimony is a member selected from the group consisting of an antimony oxide, an antimony halide, an antimony carboxylate, a compound of antimony combined with ether, antimony hydroxide, and an antimony sulfide.

7. The method according to claim 6, wherein said antimony oxide is selected from the group consisting of antimony trioxide, antimony tetraoxide, and antimony pentoxide; said antimony halide is selected from the group consisting of antimony trichloride and antimony trifluoride; said antimony carboxylate is selected from the group consisting of antimony triacetate, antimony tristearate, antimony tribenzoate, antimony tri-2-ethylhexanoate, and antimony trioctoate; said compound of antimony combined with ether is selected from the group consisting of antimony trimethoxide, antimony ethylene glycoxide, antimony triisopropoxide, antimony tri-n-butoxide, and antimony triphenoxide.

8. The method according to claim 1, wherein said compound of antimony is selected from the group consisting of antimony trioxide and antimony triacetate.

9. The method according to claim 1, wherein said titanium ester is selected from the group consisting of titanium ethyleneglycoxide, titanium tetrachloride, and potassium titanium oxyoxalate; said monoalkoxy titanate is selected from the group consisting of isopropyl triisostearoyl titanate and isopropyl tri (N-ethylenediamino) ethyl titanate; said titanate chelate is selected from the group consisting of di(cumylphenyl oxoethylene titanate and di (dioctyl) phosphato ethylene titanate; said neoalkoxytitanate is selected from the group consisting of neopentyl (diallyl) oxytri (N-ethylenediamino)ethyltitanate and neopentyl (diallyl) oxytri (dodecyl)benzenesulfonyltitanate; and said heterocyclic titanate is selected from the group consisting of cyclo (dioctyl)pyrophosphatodioctyltitanate and dicyclo (dioctyl) pyrophosphatotitanate.

10. The method according to claim 1, wherein said composite polymerization catalyst is added during or after esterification, and before polycondensation.

11. The method according to claim 1, wherein said composite polymerization catalyst is added before esterification.

12. The method according to claim 1, further comprising employing a catalyst selected from the group consisting of a germanium compound, a zinc carboxylate, a manganese carboxylate, a lead carboxylate, a compound of an alkali metal, and a compound of an alkali earth metal.

13. The method according to claim 12, wherein said germanium compound is germanium oxide; said zinc carboxylate is zinc acetate; said manganese carboxylate is manganese acetate; said lead carboxylate is lead acetate; said compound of an alkali metal is selected from the group consisting of sodium, potassium hydroxide, and potassium acetate; and said compound of an alkali earth metal is selected from the group consisting of magnesium hydroxide, calcium hydroxide, and calcium acetate.

14. The method according to claim 1, further comprising employing a polyfunctional cross-linking agent.

15. The method according to claim 14, wherein said polyfunctional cross-linking agent is selected from the group consisting of trimellitic acid, trimesic acid, pyromellitic acid, trimethylolpropane, glycerine, and pentaerythritol.

16. The method according to claim 1, further comprising employing a monofunctional terminating agent.

17. The method according to claim 16, wherein said monofunctional terminating agent is selected from the group consisting of monomethoxypolyethylene glycol, stearyl alcohol, palmitic acid, benzoic acid, and naphthoic acid.

18. The method according to claim 1, further comprising employing a thermal stabilizer.

19. The method according to claim 18, wherein said thermal stabilizer is a phosphorus compound.

20. The method according to claim 19, wherein said phosphorus compound is selected from the group consisting of phosphoric acid, phosphorous acid, metaphosphoric acid, trimethylphosphate, triethylphosphate, triphenylphosphite, dicyclohexylphosphite, diphenylphosphite, dioctylphosphite, dimethylpyrophosphate, diethylpyrophosphate, diphenylpyrophosphate, dicyclohexylpyrophosphate, and dioctylpyrophosphate.

21. The method according to claim 1, further comprising employing an antioxidant.

22. The method according to claim 21, wherein said antioxidant is a hindered phenol.

23. The method according to claim 22, wherein said hindered phenol is selected from the group consisting of IGANOX 1010, IGANOX 1076, and IGANOX 1098.

24. The method according to claim 1, further comprising employing at least one additive selected from the group consisting of a complementary color agent, an ultraviolet absorbent, an anti-softening point dropping agent, a delustering agent, a nuclear agent, a dyestuff, a fluorescent whitening agent, an antistatic agent, and a flame retardant.

25. A catalyst, consisting of:

at least one compound of antimony;

at least one compound of titanium selected from the group consisting of a compound represented by formula I $$(R_1O)_4Ti.HP(O)(OR_2)_2 \qquad I$$

wherein $R_1$ and $R_2$ are the same or different, and are independently selected from the group consisting of an aliphatic group and an aromatic aryl group, a titaium ester, a monoalkoxy titanate, a titanate chelate, a neoalkoxytitanate, and a heterocyclic titanate; and at least one compound of tin selected from the group consisting of dibutyltin salicylate, dioctyltin diacetate, dibutyltin stearate, dibutyltin maleate, dibutyltin bis(butylmaleate) and dibutyltin bis(isoctylmercaptoacetate).

26. The method according to claim 1, wherein said dicarboxylic acid is terephthalic acid.

27. The method according to claim 1, wherein said glycol is ethylene glycol.

28. The method according to claim 1, wherein said esterification product contains bis-(β-hydroxyethyl) terephthalate or a combination of β-hydroxyethyl terephthalate and the low molecular weight polymer thereof.

29. The method according to claim 1, wherein said composite polymerization catalyst is dissolved in ethylene glycol.

* * * * *